UNITED STATES PATENT OFFICE.

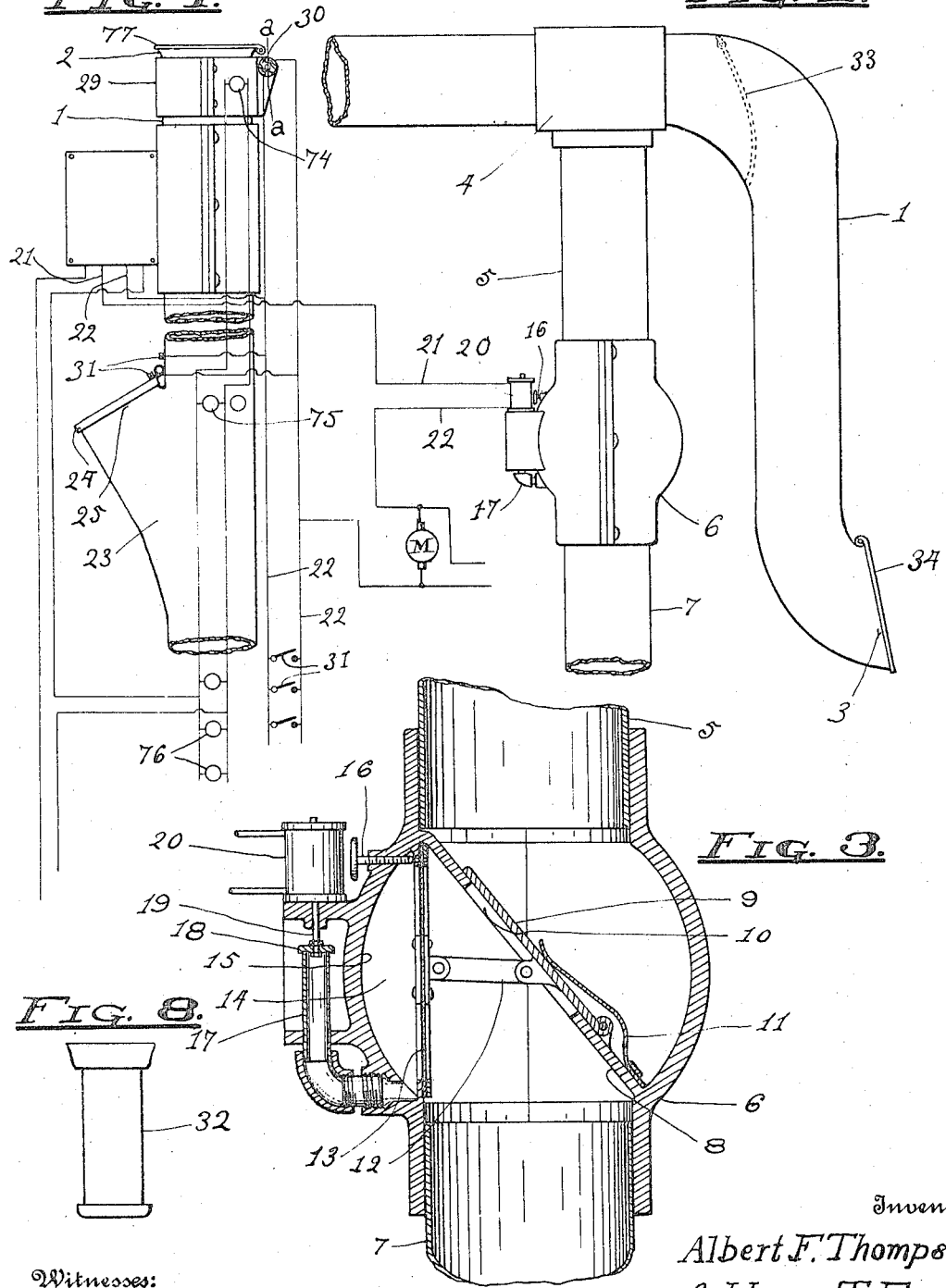

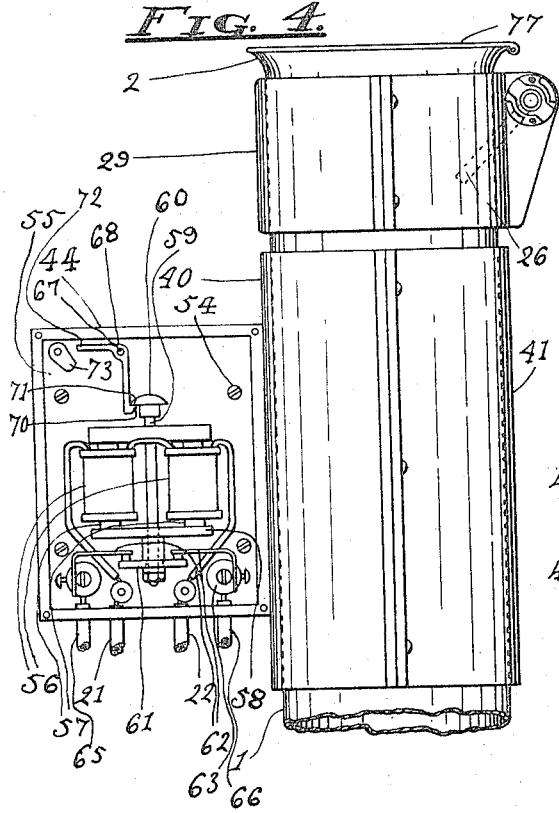
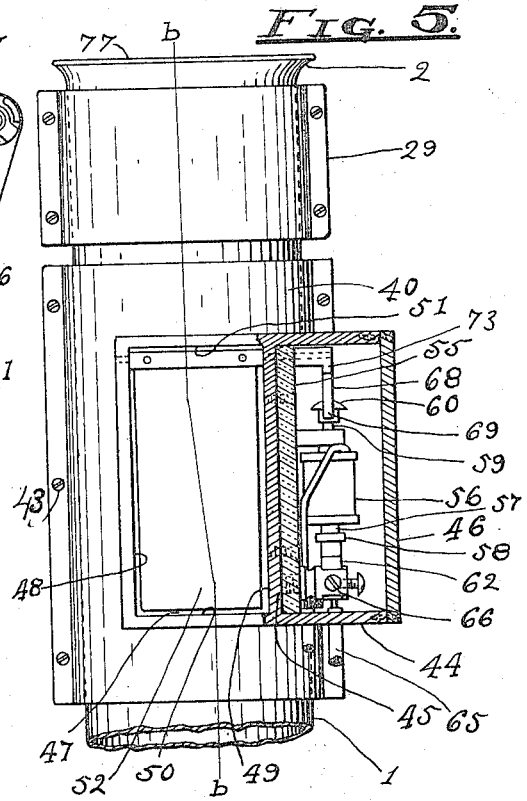
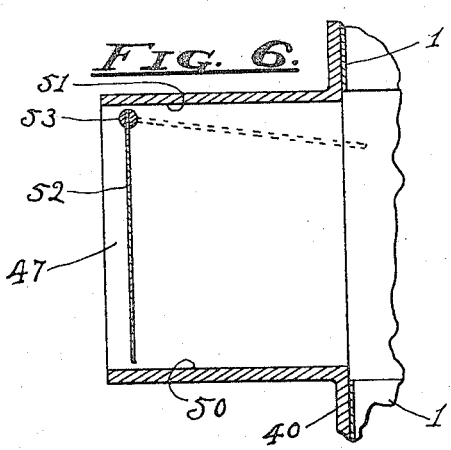
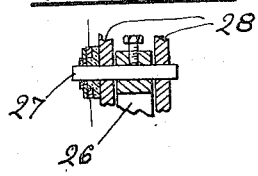

ALBERT F. THOMPSON AND HENRY T. FREE, OF KANSAS CITY, MISSOURI.

INDICATING SYSTEM FOR PNEUMATIC CONVEYERS.

1,221,924.   Specification of Letters Patent.   Patented Apr. 10, 1917.

Application filed December 13, 1915. Serial No. 66,499.

*To all whom it may concern:*

Be it known that we, ALBERT F. THOMPSON and HENRY T. FREE, citizens of the United States, residing at Kansas City, in the county of Jackson and State of Missouri, have invented certain new and useful Improvements in Indicating Systems for Pneumatic Conveyers, of which the following is a full, clear, and exact description, such as will enable others skilled in the art to which it appertains to make and use the same.

The invention relates to an indicating system for pneumatic tube conveying apparatus, and seeks to provide a simple and efficient form of system that will indicate at each receiving orifice on a line of tube, the insertion of a package at any receiving orifice on the line, and also indicate at all receiving orifices on the insertion of a package, whether the line is free for the passage of the package to its destination, so that the sender of the package will know whether the line is free or choked.

Lines of tube of pneumatic conveying apparatus often become choked from a package lodging and stopping in the tube before reaching its destination, and one package after another is inserted at the various receiving orifices until the tube becomes so clogged that removal of the packages is very difficult.

It is essential that some practical and reliable indicating system be provided, that will indicate at all receiving orifices the presence of a lodged package in any part of the tube so that other packages will not be inserted until the tube is cleared and freed of the lodged packages, as one package is more easily dislodged than a number of packages.

The present invention seeks to provide an improved indicating system for pneumatic tube conveying apparatus, that will indicate at all receiving orifices on a line of receiving tube and in all other desired locations, the insertions of a package in the tube at any receiving orifice on the line, and will also indicate at any and all places desired, the presence of a package lodged or stopped in the tube at any point between the place of insertion and the place of delivery of the package from the apparatus.

A further object of the invention is to indicate at all receiving orifices and elsewhere as desired, whether the vacuum pump is in operation before inserting the package beyond retraction.

With these and other objects in view, the invention consists in the improved features of connections, construction, combinations, and arrangement of parts hereinafter set forth and more particularly pointed out in the appended claims, an application of the indicating system being illustrated in the accompanying drawings, in which:

Figure 1 is a fragmentary view of an intake tube of a pneumatic tube conveying apparatus, illustrating the location of a terminal receiving orifice and an intermediate receiving orifice to which the improved indicating system is attached.

Fig. 2 is a fragmentary view of a discharge tube of a pneumatic tube conveying apparatus illustrating the location of the delivery orifice and certain other features of the apparatus, to which the improved indicating system is attached.

Fig. 3, is an enlarged broken view of an ordinary valve and valve controlling appurtenances commonly employed as a part of the pneumatic tube conveying apparatus, to which the indicating system is attached.

Fig. 4 is an enlarged fragmentary view of the intake tube of a pneumatic tube conveying apparatus, and certain mechanism of the improved indicating system, illustrating the connections.

Fig. 5 is an enlarged fragmentary view of the intake tube of a pneumatic tube conveying apparatus, and certain mechanism of the improved indicating system illustrating the connection, the wall inclosing the mechanism being broken away to show the interior.

Fig. 6 is an enlarged fragmentary view of the intake tube, and certain mechanism of the indicating system taken on line *b—b* of Fig. 5.

Fig. 7 is an enlarged fragmentary sectional view of the receiving end of the intake tube, taken on line *a—a* of Fig. 1.

Fig. 8 is a view in elevation of the package container.

The tube 1 is continuous from the receiving end 2 to the delivery end 3, and is provided with the T fitting 4, from which leads the tube 5 to the valve body 6, the tube 7 continuing from the body to the source of air exhaust, all of which is of common and well known construction.

The valve body 6 is provided with the division wall 8 to which is hingedly connected the valve 9 controlling the valve opening 10, the valve being normally seated by the spring 11 and pivotally connected by the link 12 to the diaphragm 13, forming the chamber 14 between the diaphragm and the wall 15 of the body, the needle valve 16 controlling connection between the chamber and the interior of the tube 7, and the pipe 17 leading from the chamber to the exterior, the pipe being controlled by the valve 18 which is operated by the solenoid 19 and coil 20 by electric energy conducted by the wires 21 and 22, all of which is of the usual construction.

The Y shaped section 23 of the tube 1 is provided with the hand operated lid 24, which controls an intermediate receiving orifice at 25, there usually being several of these intermediate orifices in each line of tube, that of the drawing being of usual construction.

The lid 24 is as usual so hinged as to make connection between the wires 21 and 22 when the lid is open, and to break the connection when the lid is closed.

At the receiving end 2 of the tube 1 is the usual arm 26 secured to the shaft 27, which is journaled in the walls 28 of the usual fitting 29, while mounted on the shaft is the usual switch 30 so arranged as to make connection between the wires 21 and 22 when the arm is depressed by the insertion of a package, the connection being broken when the arm is in the position shown in Fig. 4, which latter position is normally maintained by a suitable spring not shown because of the connection with the invention being conjectional only.

The wires 21 and 22 usually lead from the line, from which a motor is operated to drive an air exhaust pump or fan to exhaust the air from the tube 7, the wires being usually connected so close to the motor that the presence of current in the wires is evidence that the motor is running and exhausting air from the tubes, it is understood however that other sources of current are used to operate the solenoid 19.

It has been stated that the wires 21 and 22 connect with the coil 20, switch 30 and circuit connecting and breaking contacts controlled by the lid 24, the switches 31 representing the contact points controlled by additional lids 24, controlling additional receiving orifices 25, it being understood that there are usually several of these receiving orifices, and lids, and contact points in each line of pipe.

In the usual operation of the pneumatic tube conveying apparatus as heretofore operated the package container 32 is inserted in the end of the tube 1, or in either of the orifices 25 by opening the lid 24 connected therewith, and as the package is thrust into the end 2 of the tube the arm 26 is depressed and the switch 30 closed, throwing the electric current through the coil 20 and raising the solenoid 19 and opening the valve 18, allowing air to rush into the chamber 14 much faster than the vacuum in the tube 7 can remove it through the needle valve 16, this air pressure exerting a force on the diaphragm 13 and opening the valve 9, allowing the air to be drawn from the tubes 6 and 1 so that the air may drive the package container through the tube to the lid shaped valve 33 which the package container opens and passes by inertia, falling by inertia and gravity to the lid 34 which the package container opens and passes as it emerges from the delivery end 3 of the tube 1 to its destination. The package containers 32 are inserted through the intermediate orifices at 25 and the corresponding current contacting points are connected and the same results follow, the current being maintained in the coil 20 only while the package container is passing the arm 26, and while one of the lids 24 are open, and immediately on the current being cut off from the coil the solenoid 19 allows the valve 18 to close when the vacuum in the pipe 7 begins to draw the air from the chamber 14 and close the valve 9, the needle valve being so regulated that the time consumed closing the valve 9 will allow the package container to travel from any receiving orifice in the line of tube to the delivery end 3 of the tube and be delivered before the valve 9 is entirely closed, the conveying of packages and the operations just described being conjunctional only to the improved indicating system, the description of which follows.

The housings 40 and 41 are fitted snugly around the tube 1 and held rigidly thereto by the clamp screws 43, the housing 40 being provided with the hollow rectangular projection 44, preferable integral therewith as shown, the latter being divided by the division wall 45 and fitted with the lid 46, the chamber 47 formed by walls 48, 49, 50 and 51 having the swing door 52 fitted loosely therein and suspended from the shaft 53, the shaft being journaled in the walls 48 and 49 so that the door is free to swing as a pendulum, and the chamber 47 connecting to the interior of the tube 1, the connecting opening preferably being the full size of the chamber.

Fitted to the division wall 45 and secured thereto by screws 54 is the insulating plate 55 on which is mounted the ordinary magnetic coils 56, the latter being provided with the usual cores 57, and armature 59. To the armature is secured the stem 59, the latter being provided with the head 60, and having connected thereto and insulated therefrom the contact bar 61 which is shown in connection with the contact plates 62, the contact plates being secured to the binding posts 63 to which are connected the wires 65 and 66 of the indicating lamp circuit.

Pivoted to the insulating plate 55 by the screw 67 is the latch bar 68, the end 69 thereof being provided with the bevel 70 to deflect the bar from the path of the head 60 as the stem 59 is thrust upward, and with the right angled shoulder 71 to engage the head and hold the stem with the contact bar in connection with the contact plates 62 and 63, the arm 72 of the latch bar serving by gravity to thrust the shoulder 71 under the head when the latter is lifted by the coils, the cam arm 73 being rigidly mounted on the shaft 53 so that when the door 52 swings toward the tube the cam arm will strike the latch bar arm and release the shoulder from the head 60.

Near the end 2 of the tube 1 is the ordinary lamp 74 preferably of a red color, while near the lid 24 and receiving orifice 25 is the lamp 75, the lamps 76 representing diagrammatically positions of additional lamps serving additional receiving orifices or other locations where it is desired to indicate the operations of the pneumatic tube conveying apparatus, all the lamps being preferably red.

The pneumatic tube conveying apparatus is operated after the improved indicating system is applied thereto in precisely the same manner as before the application, and the same as that hereinbefore described, the object of the indicating system being to indicate the operation of the pneumatic tube conveying apparatus, it being understood however that it is not desired to restrict the indicating system to the type of pneumatic tube conveying apparatus shown and described herein, as the indicating system may be employed with equally advantageous results on differently constructed pneumatic tube conveying apparatus.

It is understood that the switches 30 and 31 are all connected in parallel, and that the coils 20 and 56 are connected in series therewith, so that the closing of any one of the switches will instantly magnetize all the coils, and that the lamps are all connected in parallel, and the contact bar 61 and contact plates 62 are in series with all the lamps, so that the closing of the lamp circuit will instantly light all the lamps.

When a package or the package container 32 is inserted in the end 2 of the tube 1 the arm 26 will be depressed and the switch 30 closed, when the coils 20 and 56 are instantly magnetized and the valve 9 opened as herein described before, allowing the air to be exhausted from the tube 1, at the same time connecting the bar 61 and plates 62 and instantly lighting all the lamps, but as soon as the package container passes the arm 26 the switch 30 is opened and the lights extinguished and the valve 18 closed which results in a gradual closing of the valve 9 as hereinbefore described.

It is obvious that if a package or the package container 32 be inserted in the orifice 25 of the Y shaped tube 23 the operation will be the same, all the lamps always lighting as a package or the package container is inserted in the tube at any of the various orifices, the lamps being extinguished immediately on the package container passing into the tube, so that when any one of the package sending operators is about to insert a package in the tube the flashing of the lamp adjacent the immediate receiving orifice will be a signal that a package has just been forwarded from some one of the various other receiving orifices and the operator will delay the insertion of an additional package for a few seconds, giving the package in transit time to reach its destination thus avoiding the presence of a plurality of packages in the tube simultaneously.

As the operator inserts the forward end of the package in the end 2 of the tube, or as he opens one of the lids 24 he will note whether the lamp adjacent thereto is lighted by the insertion of the tube or by the opening of the lid as the case may be and in either case in the event that the lamp is not lighted, the package will not be forwarded, as the failure of the lamp to light will be an indication that the conveying apparatus is not in working order. When the wires 21 and 22 lead from the line supplying the motor that drives the exhaust pump or fan, the failure of the lamp to light on opening the lid 24 or depressing the arm 26 will indicate that the motor is not running.

On the end 2 of the tube 1 is hinged the lid 77, which is always closed excepting while inserting a package in the end 2 of the tube the object of the lid being to compel the air which drives the package container through the tube 1 to enter the tube through the chamber 47, this being permitted by the door 52 swinging from the position of full lines in Fig. 6 to that of the dotted lines of the same figure. The smaller the tube the more necessary becomes the lid 77, while in large tubes the lid may be dispensed with.

When a package container becomes lodged in the tube at any point between the door 52 and the T shaped fitting 4 the door will not open as indicated by the dotted lines and the cam arm 73 will not release the latch bar 68 from the stem 59, and the lamps 74, 75 and 76 will remain burning after inserting the package container, thus indicating that the package container did not reach its destination and that the tube is choked, in which case the tube must be cleared before further package containers are inserted in any of the receiving orifices.

In all cases when the tube 1 is clear from the end 2 to the T shaped fitting 4 and a vacuum created in the tube, the door 52 will be immediately opened by the inrushing air, and the cam arm 73 will immediately release the latch bar 68 from the stem 59 and allow the armature 58 to fall by gravity and release the contact bar 61 from the contact plates 62, when the lamp circuit will be instantly opened and the lamps extinguished.

From the foregoing description it will be understood that provided a vacuum is created in the tube 7, when a package container is inserted in any one of the receiving orifices and allowed to enter the tube 1 the lamps will burn during the time of insertion of the package container, and that provided the tube is in working condition the lamps will be immediately extinguished, but if the tube is choked or clogged and if there is no vacuum in the tube 7, the lamps will continue to burn and it will be known that the tube is choked, or that the conveying apparatus is not in working order.

It is obvious that bells and annunciators may be substituted for the lamps of the improved indicating system, and that changes may be made in the connections and the details of construction without departure from the essentials of the invention.

What we claim as new, and desire to secure by Letters Patent, is:—

1. In an indicating system for pneumatic tube conveying apparatus, a tube, means to convey packages through said tube, indicating lamps, means to light said lamps when a package is inserted in said tube, and means operated by the air driving said packages whereby said lamps are extinguished as said packages pass through said tube.

2. In an indicating system for pneumatic tube conveying apparatus, a pneumatic tube conveying apparatus, means actuated upon the insertion of a package in said apparatus for operating indicating devices at all desired locations, and means to indicate before the insertion of a package when the apparatus is in operative condition.

3. In an indicating system for pneumatic tube conveying apparatus, a pneumatic tube conveying apparatus, lamps, means whereby said lamps will be lighted during the insertion of a package in said apparatus, means whereby said lamps will be immediately extinguished on the insertion of a package provided said apparatus is operative, and means whereby said lamps will continue to burn after the insertion of the package provided said apparatus is inoperative.

4. In an indicating system for pneumatic tube conveying apparatus, a receiving tube, an opening in said tube, a swinging door controlling said opening, a plurality of electrically lightable lamps, a plurality of orifices in said tube to receive packages, means operatable whereby the insertion of a package in either of said orifices said lamps are lighted, means operatable by said door whereby said lamps are extinguished, and said door positioned and arranged to operate only when packages are traversing said tube.

5. In an indicating system for pneumatic tube conveying apparatus, a tube, means by which indicating signals are registered at a plurality of locations when a package is inserted in said tube, and means by which a partial vacuum in said tube will retract the registration of said signals.

6. In an indicating system for pneumatic tube conveying apparatus, a tube, means by which indicating signals are registered at a plurality of locations when a package is inserted in said tube, and means by which said signals will continue to register until a partial vacuum is created in said tube.

In testimony whereof we affix our signatures in the presence of two witnesses.

ALBERT F. THOMPSON.
HENRY T. FREE.

Witnesses:
REBECCA JOFFEE,
RUTH REDGELL.